(12) United States Patent
Sonalkar et al.

(10) Patent No.: US 7,865,607 B2
(45) Date of Patent: Jan. 4, 2011

(54) SERVLET MODEL FOR MEDIA RICH APPLICATIONS

(75) Inventors: Rohit Sonalkar, Milpitas, CA (US);
Suparna Pal, Milpitas, CA (US);
Swaroop Kulkarni, Milpitas, CA (US);
Piyush Modi, Milpitas, CA (US)

(73) Assignee: Movius Interactive Corporation, Duluth, GA (US)

( * ) Notice: Subject to any disclaimer, the term of this patent is extended or adjusted under 35 U.S.C. 154(b) by 874 days.

(21) Appl. No.: 11/730,925

(22) Filed: Apr. 4, 2007

(65) Prior Publication Data

US 2007/0280226 A1   Dec. 6, 2007

Related U.S. Application Data

(60) Provisional application No. 60/788,701, filed on Apr. 4, 2006.

(51) Int. Cl.
*G06F 15/16* (2006.01)
(52) U.S. Cl. .................. 709/230; 709/202; 709/227
(58) Field of Classification Search .................. None
See application file for complete search history.

(56) References Cited

U.S. PATENT DOCUMENTS

| 6,418,199 | B1 | 7/2002 | Perrone |
| 6,601,099 | B1 | 7/2003 | Corneliussen |
| 6,678,735 | B1 | 1/2004 | Orton et al. |
| 6,870,848 | B1 | 3/2005 | Prokop |
| 6,934,279 | B1 | 8/2005 | Sollee |
| 7,103,156 | B2 * | 9/2006 | Celi et al. ................ 379/88.14 |
| 7,330,899 | B2 * | 2/2008 | Wong ........................ 709/230 |
| 7,450,566 | B2 * | 11/2008 | Wong ........................ 370/352 |
| 2003/0131151 | A1 * | 7/2003 | Roach et al. ................ 709/328 |
| 2007/0081520 | A1 * | 4/2007 | Da Palma et al. ........... 370/352 |

FOREIGN PATENT DOCUMENTS

JP   2005252341   9/2005

* cited by examiner

*Primary Examiner*—John B. Walsh
(74) *Attorney, Agent, or Firm*—Smith Frohwein Tempel Greenlee Blaha, LLC; Gregory Scott Smith (57) ABSTRACT

A media rich SIP servlet is enabled using a media control layer and a conventional SIP Servlet container. The media rich SIP servlet provides a media control API that can be used by SIP-based application developers to incorporate media rich functions into SIP-based applications. The media rich SIP servlet includes an advanced call control API, which enhances the basic call control functions provided by a SIP servlet. The media rich SIP servlet provides call and media control primitives for use by SIP servlet based applications, thereby enabling media rich SIP servlet based applications.

20 Claims, 10 Drawing Sheets

PRIOR ART

FIG. 1

PRIOR ART

FIG. 2

PRIOR ART

SERVLET MODEL FOR MEDIA RICH APPLICATIONS

CROSS-REFERENCE TO RELATED APPLICATIONS

The present application claims the benefit of U.S. Provisional Patent Application No. 60/788,701 filed on Apr. 4, 2006, which is herein incorporated by reference in its entirety.

BACKGROUND OF THE INVENTION

1. Field of the Invention

The present invention relates generally to Session Initiation Protocol (SIP) based applications. More particularly, the invention relates to a method, system, and computer program product for enabling media rich SIP-based applications.

2. Background Art

The Java 2 Enterprise Edition (J2EE) platform is an end-to-end architecture that provides a programming model that uses Servlets, Java Server Pages (JSPs), and Enterprise JavaBeans (EJBs) to implement and deploy business logic.

An aspect of the J2EE platform is the use of "containers" to simplify the development of business logic, with each container providing reusable components for use by application developers. For example, the EJB container handles distributed communication, threading, and transaction management. Similarly, Java Servlets simplify web development by providing infrastructure for component, communication, and session management in a web container integrated within a web server.

Session Initiation Protocol (SIP) is a signaling protocol for multimedia applications such as IP telephony applications, instant messaging, and online games, for example. Based on simple signaling, SIP enables rapid establishment of sessions over IP (Internet Protocol).

To support SIP in a J2EE platform, Java Specification Request (JSR) 116 (a Sun JCP (Java Community Process) standard) defines a Session Initiation Protocol (SIP) Servlet Application Programming Interface (API) to simplify the task of building SIP-based applications. The SIP Servlet API together with a SIP protocol stack provides a SIP Servlet container, based on which SIP-based applications can be developed in a J2EE platform.

A SIP Servlet container is integrated onto a J2EE platform in a similar way to an EJB container or a Web container, and provides basic functions enabling the development of user agents, proxies, and registrars for SIP-based applications. These basic functions allow a SIP-based application developer, for example, to create SIP sessions in a J2EE architecture. However, they are limited to SIP-based call control.

Many SIP-based applications, such as telephony for example, require SIP-based call control and media control functionality. Other SIP-based applications require advanced call control functions that cannot be afforded by the basic functions available through the basic SIP Servlet container. Thus, an improved SIP Servlet model is needed.

An improved SIP servlet model enabling fast and easy development of complex media rich SIP-based applications is needed.

BRIEF SUMMARY OF THE INVENTION

A media rich servlet for enabling media rich SIP-based applications is disclosed herein. The media rich SIP servlet is enabled using a media control layer and a conventional SIP Servlet container. The media rich SIP servlet provides a media control API that can be used by SIP-based application developers to easily incorporate media rich functions into SIP-based applications. In addition, the media rich SIP servlet includes an advanced call control API, which enhances the basic call control functions provided by a SIP Servlet. Accordingly, the media rich SIP servlet provides call and media control primitives for use by SIP servlet based applications, thereby enabling media rich SIP servlet based applications.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Embodiments of the present invention will be described with reference to the accompanying drawings. The drawing in which an element first appears is typically indicated by the leftmost digit(s) in the corresponding reference number.

DETAILED DESCRIPTION OF EMBODIMENT(S)

Introduction

The Java 2 Enterprise Edition (J2EE) platform is an end-to-end architecture that provides a programming model that uses Servlets, Java Server Pages (JSPs), and Enterprise JavaBeans (EJBs) to implement and deploy business logic. One aspect of the J2EE platform is the use of "containers" to simplify the development of business logic, with each container providing reusable components for use by application developers.

Figure 1:
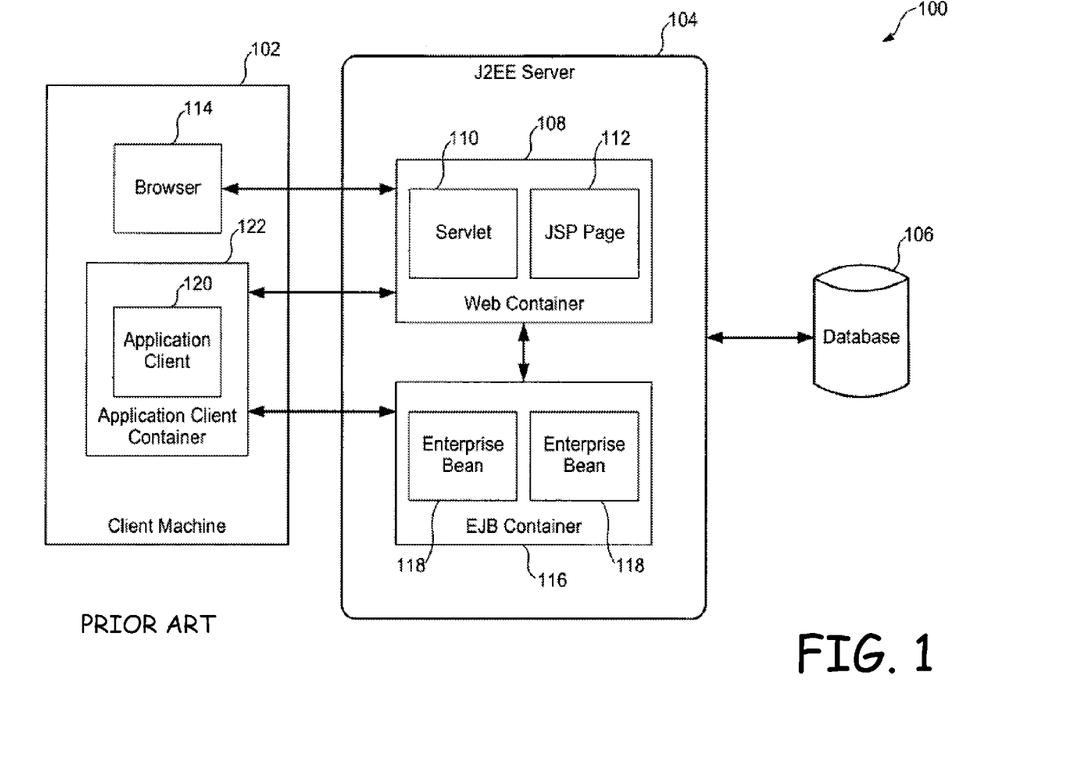
FIG. 1 schematically illustrates a simplified J2EE platform.

FIG. 1 schematically illustrates a simplified J2EE platform 100. J2EE platform 100 includes a client machine 102, a J2EE server 104, and a database 106. Resident on J2EE server 104 are "containers" which provide low-level functions to applications that run on client machine 102. For example, web container 108, which includes a Servlet 110 and a Java Server Page (JSP) 112, provides web components for security, concurrency, life-cycle management, transaction, deployment, and other services for web sessions provided by Browser 114 running on client machine 102. Similarly, EJB container 116, which includes Enterprise Beans 118, provides distributed communication, threading, and transaction management for use by Application Client 120, the execution of which is managed by Application Client Container 122.

Database 106 is responsible for the actual storage of data used by J2EE Server containers. In practice, database 106 may include a database logic layer and a database manager layer, with the database manager layer generating physical storage facilities of the data on the basis of a database logic (typically written in SQL) stored in the database logic layer.

Figure 3:
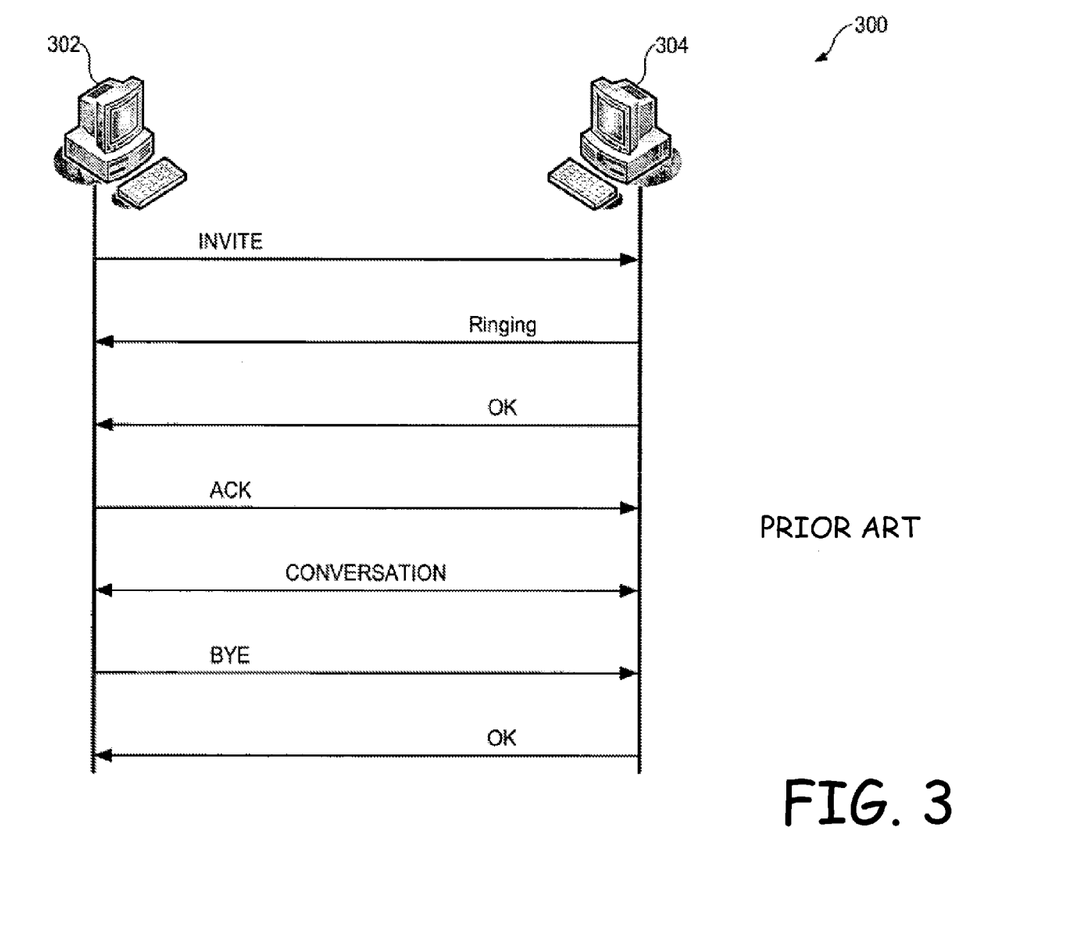
FIG. 3 is a diagram that illustrates a conventional SIP call process.

Due in part to its simplicity, the Session Initiation Protocol (SIP) is a popular protocol currently proposed for establishing multimedia sessions. SIP is a signaling protocol that provides functionality for handling the setup, modification, and teardown of multimedia sessions. FIG. 3 is a diagram that illustrates a typical SIP call process 300 between two SIP users 302 and 304. Call process 300 begins with SIP user 302, the calling party, sending a SIP INVITE message to SIP user 304, the called party. The SIP INVITE message invites SIP user 304 to participate in a session with SIP user 302. A number of interim responses to the INVITE message might take place prior to the called party accepting the call. For example, the caller might be informed that the call is queued and/or that the called party is being alerted to the INVITE request (Ringing tone). Subsequently, SIP user 304 accepts the call, which generates an OK response back to the caller, SIP user 302. The calling party, SIP user 302, acknowledges that the called party, SIP user 304, has answered by issuing an ACK message. At this point, a conversation including media (e.g, voice, video, etc.) can be exchanged between the two SIP users. Finally, when one of the parties hangs up (SIP user 302 in FIG. 3), a BYE message is sent to the other party. The other party (SIP user 304 in FIG. 3) confirms its receipt of the BYE message by issuing an OK message, thereby ending the session.

To incorporate SIP in a J2EE architecture, Java Specification Request (JSR) 116 (a Sun JCP standard) defines a Session Initiation Protocol (SIP) Servlet API to simplify the task of building SIP-based applications. In an exemplary embodiment, the SIP Servlet API together with a SIP protocol stack provides a SIP Servlet container, which can be integrated in a J2EE platform similar to a Web container or an EJB container, for example.

Figure 2:
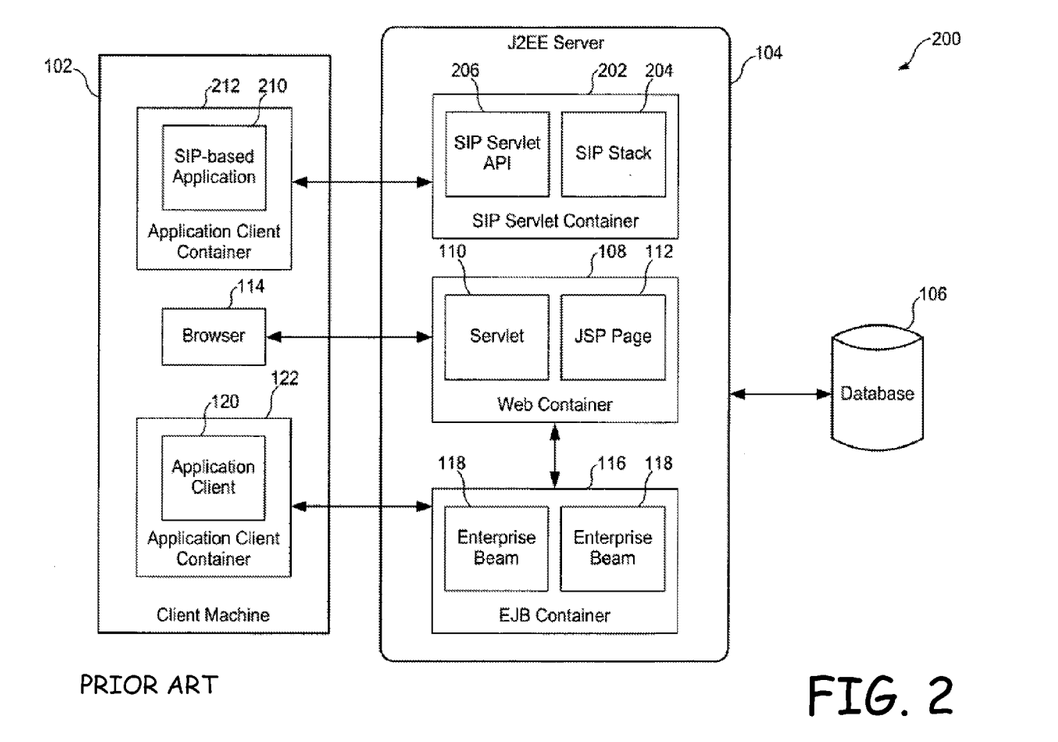
FIG. 2 schematically illustrates a J2EE platform having a SIP Servlet container.

FIG. 2 schematically illustrates a J2EE platform 200 having a SIP Servlet container 202. SIP Servlet Container 202 resides on J2EE server 104, and includes a SIP Servlet API 206 and a SIP protocol stack 204. SIP Servlet container 202 provides basic functions enabling the development of user agents, proxies, and registrars for SIP-based applications running on client machine 102. For example, SIP Servlet container 202 provides basic functions allowing SIP-based application 210 to create SIP sessions. SIP-based application 210 is managed by application client container 212.

Conventionally, functions provided by a SIP Servlet container for use by SIP-based application developers remain limited to basic call control functions related to session establishment, modification, and teardown. JSR 116, for example, is silent on integrating media control as well as advanced call control using a SIP Servlet container, functions required by a multitude of SIP-based applications.

Embodiments of the present invention extend the current SIP Servlet container to provide media control and advanced call control functionality to SIP-based application developers, thereby enabling fast and easy development of media rich SIP-based applications. The following description presents exemplary embodiments of a media rich servlet model for achieving this objective.

Media Rich Servlet Model

Figure 4:
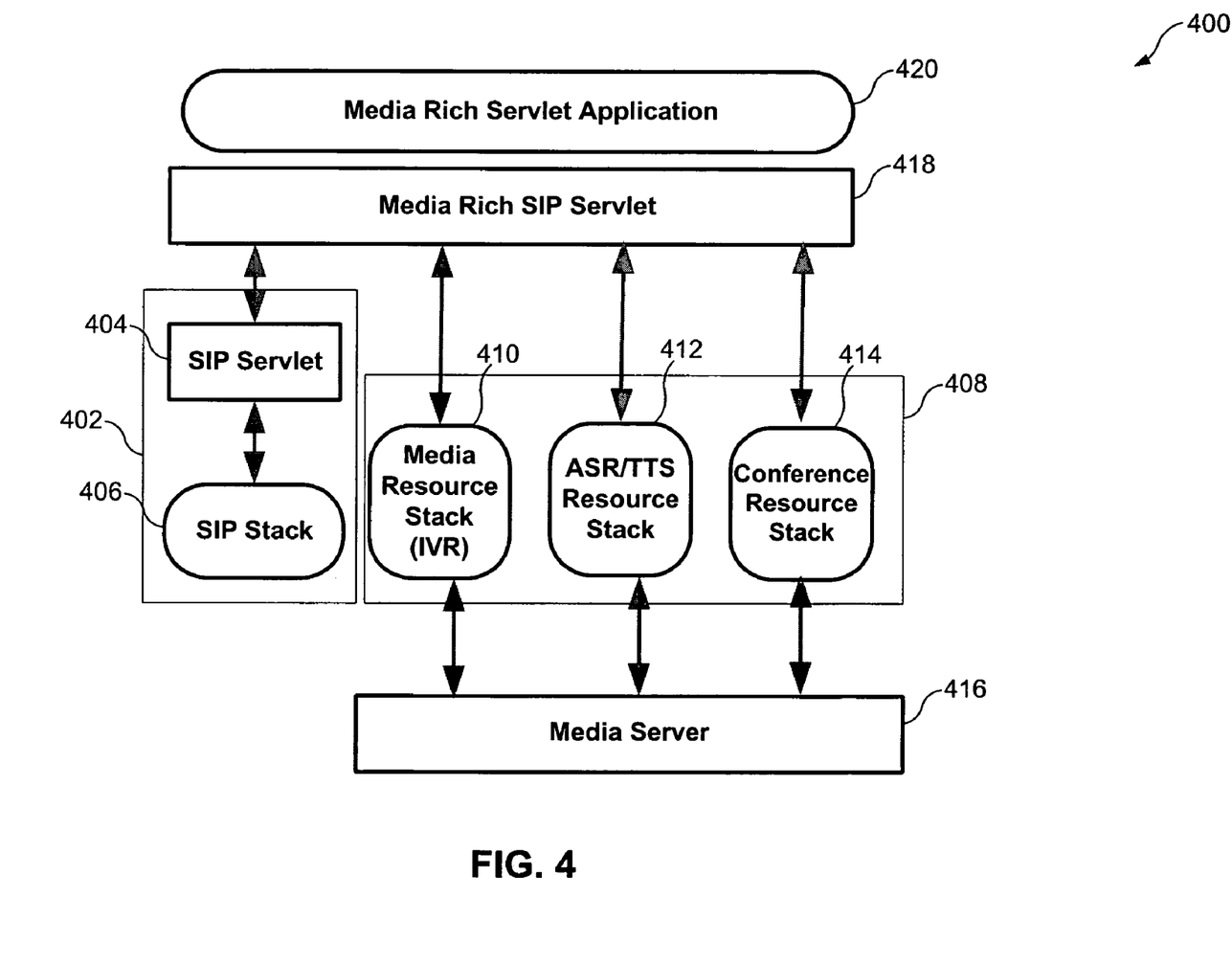
FIG. 4 schematically illustrates an architecture having a media rich SIP Servlet.

FIG. 4 schematically illustrates an architecture 400 having a media rich SIP Servlet according to an embodiment of the present invention. Architecture 400 includes a SIP Servlet container 402, a media control layer 408, and a media server 416. SIP Servlet container 402 is a conventional SIP Servlet container, which includes a SIP Servlet 404 and SIP stack 406.

Media control layer 408 includes a media resource stack 410, an Automatic Speech Recognition (ASR) and Text-to-Speech (TTS) resource stack 412, and a conference resource stack 414. Media resource stack 410 is configured to control Interactive Voice Response (IVR) functions. ASR/TTS resource stack 412 is configured to control Automatic Speech Recognition and Text-to-Speech functions, and conference resource stack 414 is configured to control conference functions. In an embodiment, media control layer 408 communicates with media server 416 using a MGCP (Media Gateway Control Protocol) interface.

Using functionality provided by its resource stacks, media control layer 408 provides media control functions that together with a conventional SIP Servlet container enable a media rich SIP servlet 418. Media rich SIP servlet 418 not only includes a basic call control API, as provided by a conventional SIP Servlet, but also provides a media control API that can be used by SIP-based application developers to easily incorporate media rich functions into SIP-based applications. In addition, media rich SIP servlet 418 may include an advanced call control API, which enhances the basic call control functions provided by a SIP Servlet. Accordingly, media rich SIP servlet 418 provides call and media control primitives for use by a SIP servlet based application, thereby enabling media rich SIP servlet based application 420. In an embodiment, the media control API and the advanced call control API may be integrated in a single API which is used by SIP servlet based applications. In another embodiment, the media control API and the advanced call control API may be separate.

The media control API and the advanced call control API provided by media rich SIP servlet 418 are protocol and device independent. In other words, media and advanced call control functionality provided by the APIs are independent of the type of signaling protocol employed to establish the multimedia session. For example, referring to FIG. 4, SIP servlet container 402 may be replaced by a different signaling protocol container (e.g., H323 container) to generate a media rich servlet for that signaling protocol (e.g, media rich H323 Servlet).

The media control API and the advanced call control API further are independent of the type of device running the SIP-based application that employs the APIs. For example, SIP-based applications may be web-based or telephony-based and yet access the same media control and advanced call control APIs.

Figure 9:
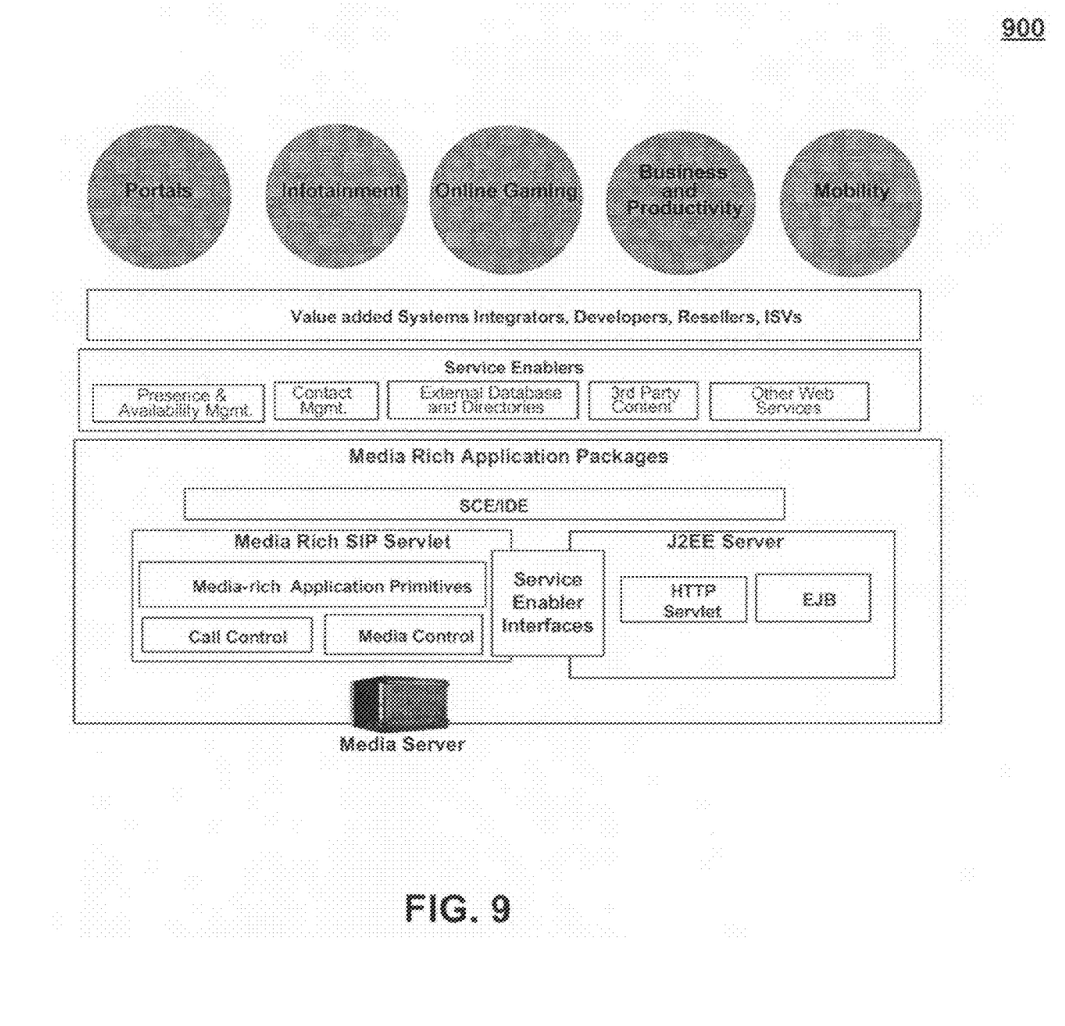
FIG. 9 schematically illustrates integration of a media rich SIP servlet in an architecture that supports different applications.

FIG. 9 schematically illustrates an exemplary integration of a media rich SIP servlet in an architecture 900 that supports different applications. As shown, architecture 900 may support a plurality of applications including, for example, portals, infotainment applications, online gaming applications, business and productivity applications, and mobility applications.

Architecture 900 may be used by Value added System Integrators, Developers, Resellers, and Independent Software Vendors (ISVs).

In an exemplary embodiment, architecture 900 allows the integration of media rich application packages and services enabled by Service Enablers (SEs) to support the above described applications. For example, architecture 900 allows the integration of media rich application packages with Presence and Availability Management services, Contact Management services, External Database and Directories services, third party content services, and other web services.

In the exemplary embodiment illustrated in FIG. 9, the media rich application packages may be developed using a Software Creation Environment (SCE) and/or an Integrated Development Environment (IDE) that make use of the media rich SIP servlet and a J2EE server.

Exemplary Implementations

Exemplary embodiments for implementing the media rich servlet model described above will now be provided. These examples are provided for illustration purposes only and are not limiting.

Figure 5:
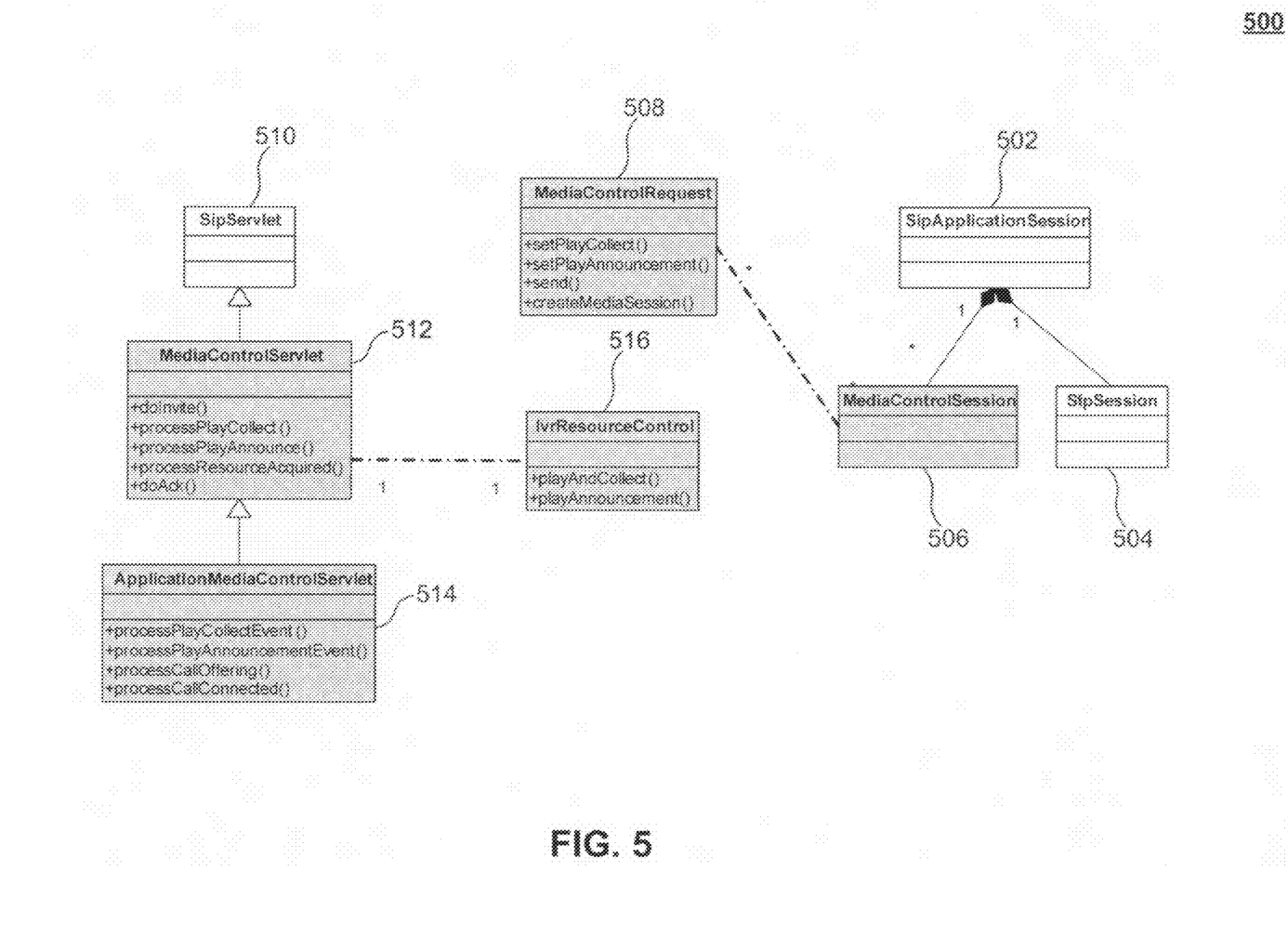
FIG. 5 schematically illustrates an implementation of a media rich SIP Servlet.

FIG. 5 is a class diagram that schematically illustrates an implementation 500 of a media rich SIP servlet. In this implementation, a SIP Application Session 502 contains a SIP session 504 and a Media Control Session 506. SIP Application Session 502 is initiated by a SIP-based application. Media control session 506 can be queried from SIP Application Session 502 using the "MediaControlSession" tag and can be created using a Media Control Request object 508.

Media control servlet 512 is derived from a SIP servlet 510. Accordingly, media control servlet 512 intercepts all of SIP Servlet 510 lower-level call backs, processes the SIP Servlet lower-level calls backs, and provides higher-level call backs to application media control servlet 514, which is derived from media control servlet 512. In an embodiment, media control servlet 512 provides a set of call back functions to application media control servlet 514 to hide the details of SIP and IVR related call control, including processPlayCollectEvent( ), processPlayAnnouncementEvent( ), and processCallOffering( ). Note that application media control servlet 514 does not implement any SIP Servlet call backs such as doInvite( ) or doAck( ), for example, because Media Control Servlet 512 intercepts these methods as will be shown in the sequence diagram of FIG. 6.

Calls to application media control servlet 514 include a Media Control Request object 508. For example, to play announcements or other IVR functionalities, application media control servlet 514 sets appropriate parameters into Media Control Request object 508 through proper API. In an embodiment, the API includes several functions to set IVR parameters, including setPlayCollect( ), setAnnouncement( ), and send( ). The send( ) function sends the media request to IVR Resource Control 516, which negotiates the media request with the media server. IVR Resource Control 516 can be implemented over MGCP or SIP stack.

Figure 6:
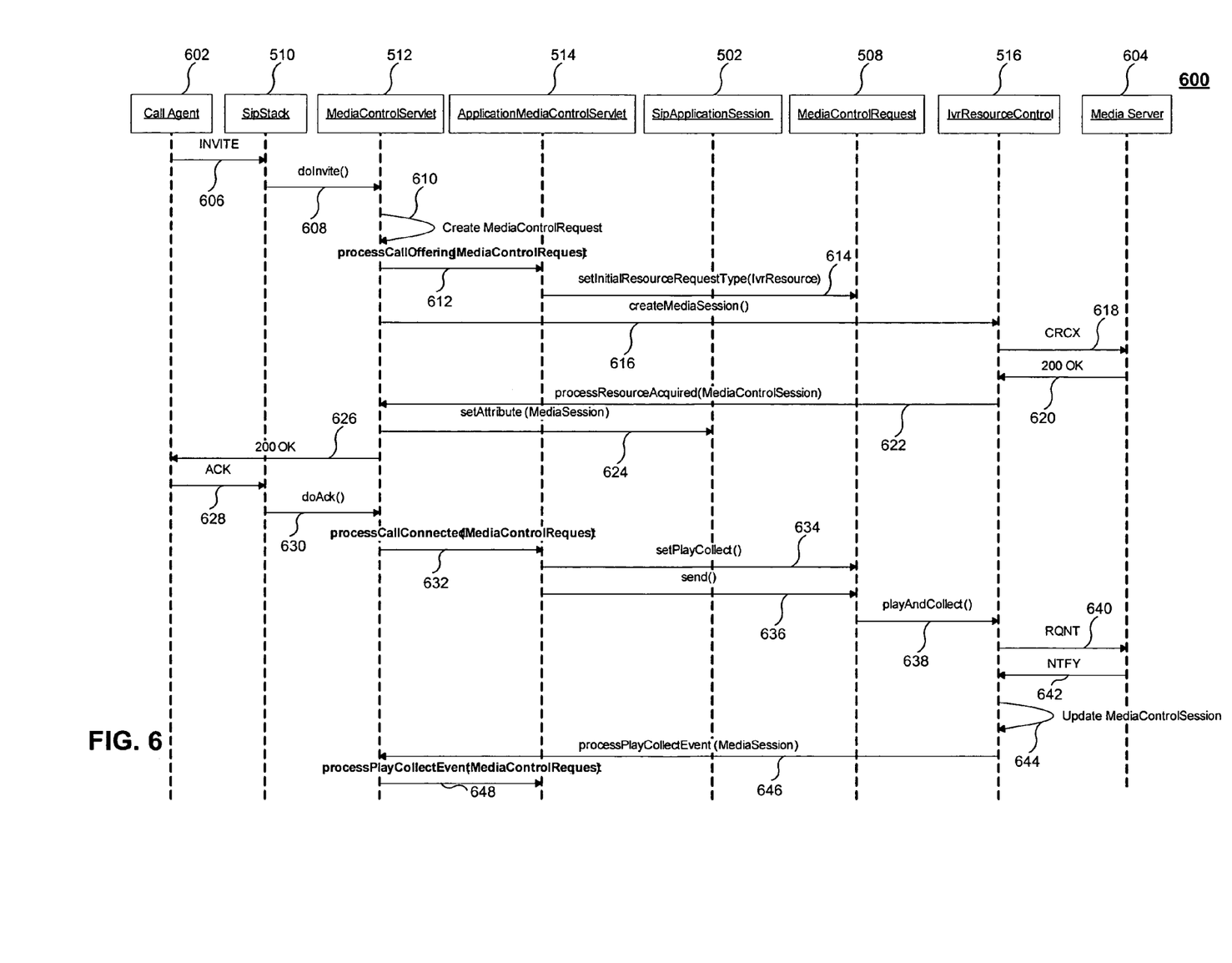
FIG. 6 schematically illustrates a media rich SIP call process according to the implementation of FIG. 5.

FIG. 6 schematically illustrates a media rich SIP call process 600 according to the exemplary implementation of FIG. 5. Process 600 begins in step 606, which includes SIP stack 510 receiving a SIP INVITE from a call agent 602.

In step 608, SIP stack 510 relays the SIP INVITE to media control servlet 512 using call function doInvite( ). In response, media control servlet 512, in step 610, creates a media control request object 508 and, in step 612, passes the created media request object as an argument in call function processCallOffering( ) to application media control servlet 514.

In step 614, application media control servlet 514 sets the requested media resource in media control request 508. For example, the media resource may be an IVR resource or a conference resource. An IVR resource provides IVR functionalities. A conference resource provides stream mixing functionalities along with IVR functionalities. In example process 600, the requested resource is an IVR resource. As such, in step 616, media control servlet 512 requests that IVR resource control 516 creates a media control session.

IVR resource control 516 uses either MGCP/BAU (Base Audio Server) or MSML (Media Server Markup Language)/SIP or any other suitable IVR protocol package to negotiate with media server 604 to reserve an IVR resource. In the case of MGCP, as illustrated in example process 600 in steps 618 and 620, IVR resource control 516 sends a CRCX message to media server 604 to reserve the IVR resource, to which media server 604 responds with a 200 OK message to confirm the reservation. IVR resource control 516 subsequently, in step 622, returns the created media control session object to media control servlet 512. In an embodiment, IVR resource control passes the media control session object as an argument in the call function processResourceAcquired( ).

In step 624, media control servlet 512 stores the media control session object in SIP application session 502 using the setAttribute( ) function provided by the SIP application session. Subsequently, in steps 626, 628, and 630, media control servlet 512 sends a SIP 200 OK message to call agent 602 in response to the received SIP INVITE and receives an ACK message back through SIP stack 510. In an embodiment, step 630 is performed using the doAck( ) function called by SIP stack 510, which invokes, in step 632, the processCallConnected( ) call back application media control servlet 514.

In subsequent steps 634, 636, and 638, application media control servlet starts the IVR call by invoking the setPlayCollect( ) function of media control request object 508 and the send( ) function to execute it. This triggers IVR resource control 516 to send, in step 640, a notification request RQNT to media server 604, which responds with a notify NTFY in step 642. This sets up media server 604 to notify IVR Resource Control 516 of certain events.

Once IVR resource control 516 receives the NTFY from media server 604, it updates the media control session in step 644 and passes it in step 646 to media control servlet 512 as an argument in call back function processPlayCollectEvent( ). Media control servlet 512 in step 648 invokes the processPlayCollectEvent( ) call back function of application media control servlet 514, which plays a prompt and collects DTMF digits entered by a user.

Figure 7:
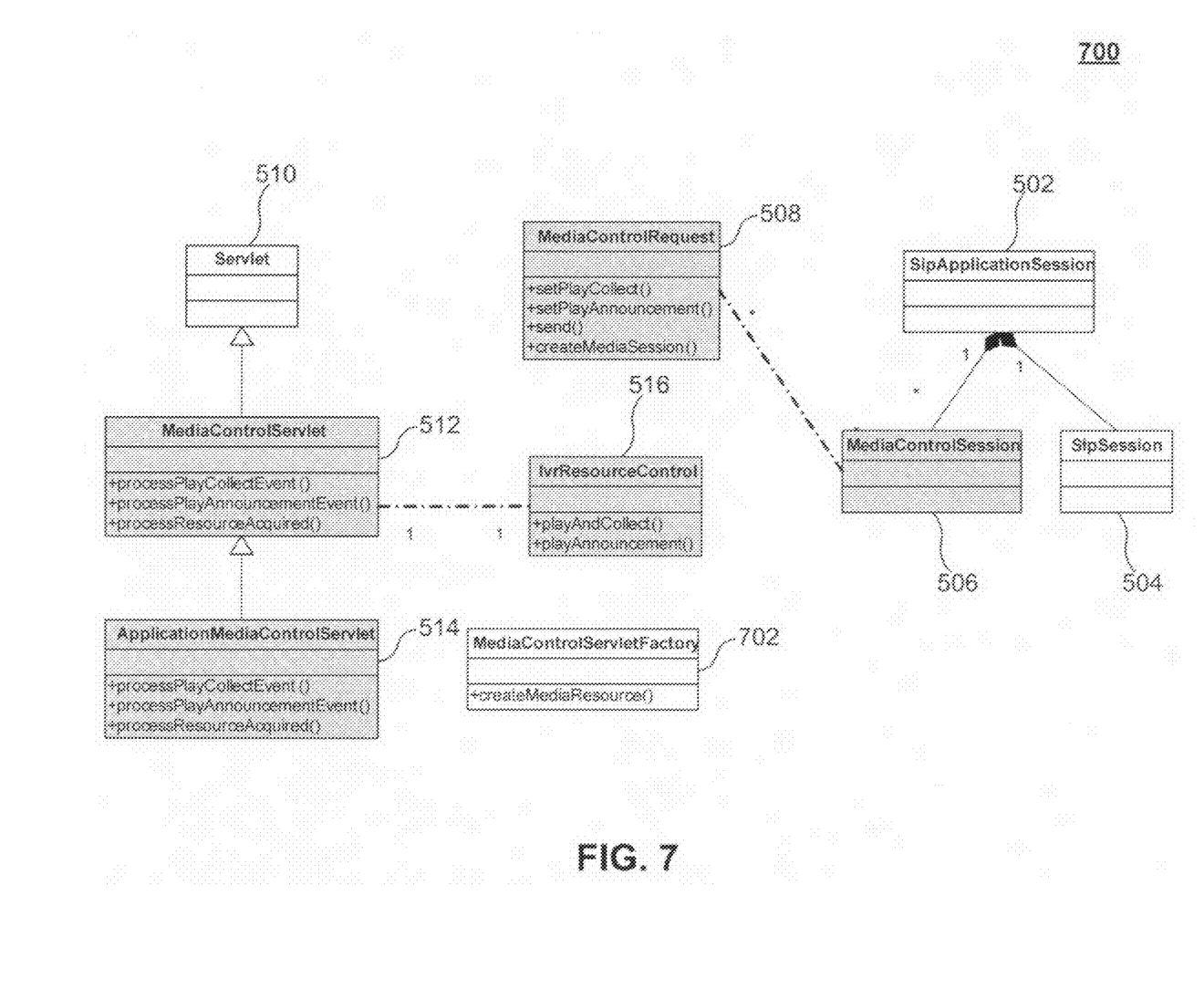
FIG. 7 schematically illustrates another implementation of a media rich SIP Servlet.

FIG. 7 is a class diagram that schematically illustrates another implementation 700 of a media rich SIP Servlet. In contrast to implementation 500 of FIG. 5, which implements a tight integration between SIP Servlet 510 and media control servlet 512, implementation 700 uses separate media control servlet and SIP Servlet. Accordingly, as shown in FIG. 7, a media control session is instantiated from SIP Servlet 510 using a Media Control Servlet Factory 702, as opposed to being created by media control servlet 512. Other aspects of the implementation of FIG. 7 are substantially similar to the implementation of FIG. 5 described above.

Figure 8:
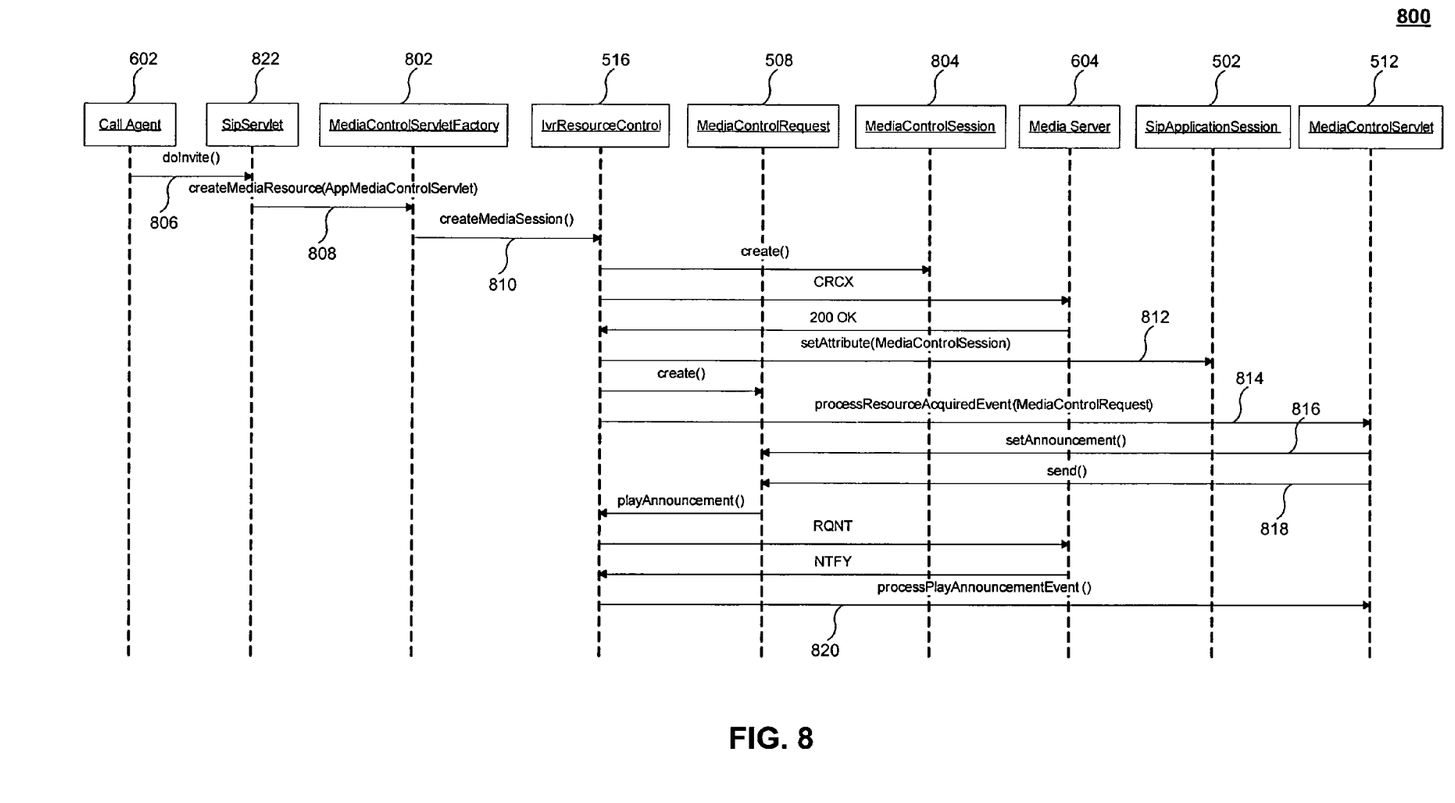
FIG. 8 schematically illustrates a process for media session instantiation according to the implementation of FIG. 7.

FIG. 8 schematically illustrates a process 800 for media session instantiation according to implementation 700 of FIG. 7. Certain aspects of process 800 are substantially similar to process 600 described above and will not be described herein. Process 800 begins in step 806, which includes receiving a doInvite( ) function call at SIP Servlet 822. Note that this is different than in process 600 where an INVITE message is first received at the SIP stack, which invokes the doInvite( ) call at media control servlet 512.

In step 808, SIP servlet 822 invokes a createMediaResource( ) function call at media control servlet factory 802, which in turn, in step 810, invokes a createMediaSession( ) function call at IVR resource control 516. IVR resource control 516 creates a media control session 804 and then, as in process 600, negotiates with media server 604 to reserve the requested resource. Once that is achieved, in step 812, IVR resource control 516 directly stores created media control session 508 in SIP application session 502, as opposed to performing that through media control servlet 512 in process 600.

Subsequently, IVR resource control 516 creates a media control request 508 and, in step 814, passes it to media control servlet 512 using a processResourceAcquiredEvent( ) function call. Media control servlet 512, in steps 816 and 818, directly sets and executes IVR parameters in media control request object 508. Note that in process 600, media control servlet 512 performs similar steps through application media control servlet 514. In the example of FIG. 8, media control servlet 512 invokes a setAnnouncement( ) function, which is used to play announcements in situations where there is no need for interaction with the user. IVR resource control 516 processes this function, in step 820, by invoking a processPlayAnnouncementEvent( ) function at media control servlet 512.

Example Computer Implementation

Figure 10:
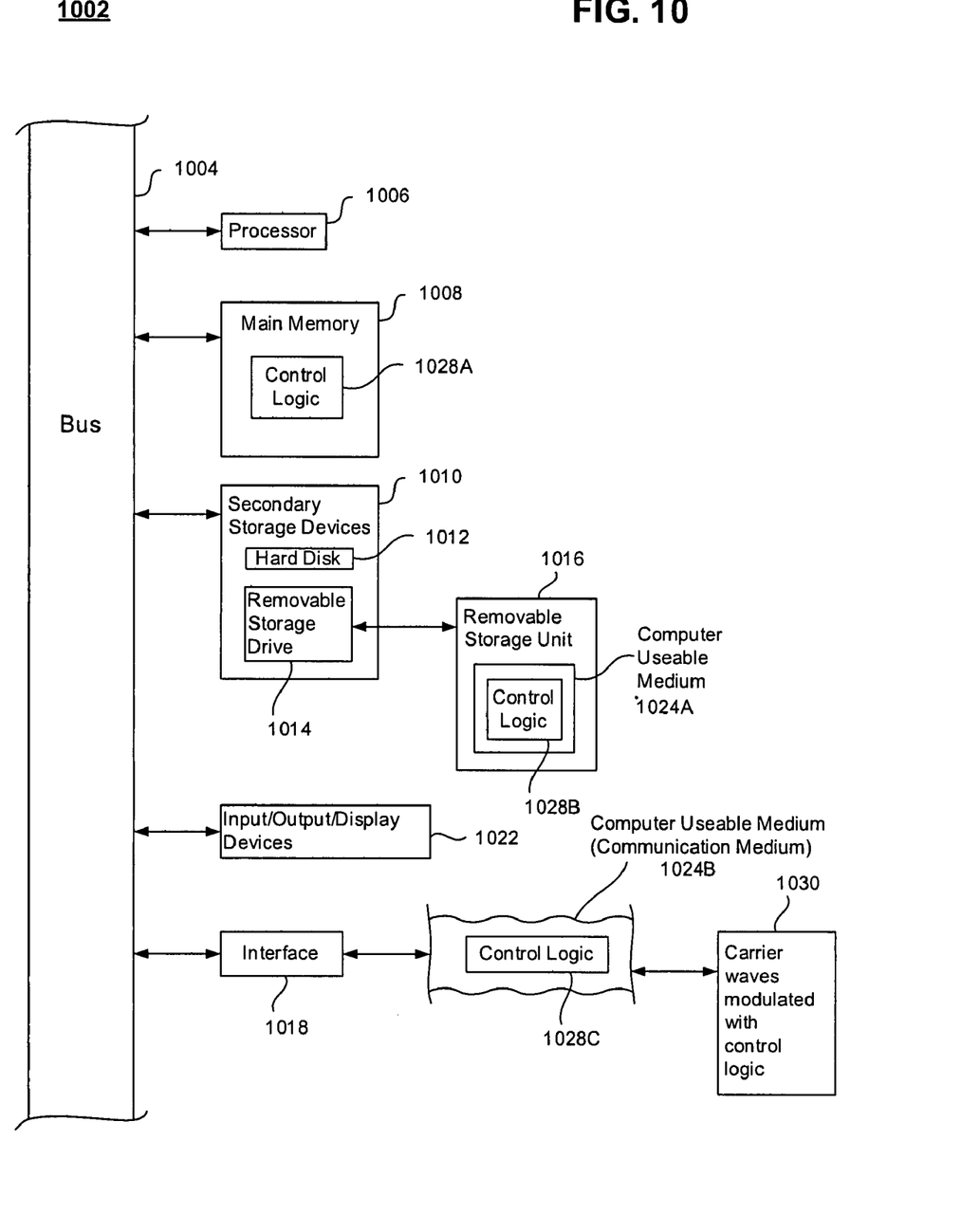
FIG. 10 schematically illustrates an example computer useful for implementing components of the invention.

In an embodiment of the present invention, the system and components of the present invention described herein may be implemented using well known computers, as computer 1002 schematically illustrated in FIG. 10.

Computer 1002 can be any commercially available or later developed computer capable of performing the functions described herein; well known examples of such computers are available from International Business Machines, Apple, Sun, HP, Dell, Compaq, Digital, Cray, etc.

Computer 1002 may include one or more processors (also called central processing units, or CPUs) for performing the functions. For simplicity, FIG. 10 illustrates only a single processor 1006; those skilled in the art readily will appreciate that plural processors may be utilized to perform the functions described herein. Processor 1006 may be connected to a communication bus 1004.

Computer 1002 also may include a main or primary memory 1008, such as random access memory (RAM). Primary memory 1008 may have stored therein control logic 1028A (computer software), and data.

Computer 1002 also may include one or more secondary storage devices 1010. Secondary storage devices 1010 may include, for example, a hard disk drive 1012 and/or a removable storage device or drive 1014, as well as other types of storage devices, such as memory cards and memory sticks. Removable storage drive 1014 may represent a floppy disk drive, a magnetic tape drive, a compact disk drive, an optical storage device, tape backup, etc.

Removable storage drive 1014 may interact with a removable storage unit 1016. Removable storage unit 1016 may include a computer useable or readable storage medium 1024A having stored therein computer software 1028B (control logic) and/or data. Removable storage unit 1016 may represent a floppy disk, magnetic tape, compact disk, DVD, optical storage disk, or any other computer data storage device. Removable storage drive 1014 may read from and/or writes to removable storage unit 1016 in a well known manner.

Computer 1002 also may include input/output/display devices 1022, such as monitors, keyboards, pointing devices, etc.

Computer 1002 further may include a communication or network interface 1018. Network interface 1018 may enable computer 1002 to communicate with remote devices. For example, network interface 1018 may allow computer 1002 to communicate over communication networks or mediums 1024B (representing a form of a computer useable or readable medium), such as LANs, WANs, the Internet, etc. Network interface 1018 may interface with remote sites or networks via wired or wireless connections.

Control logic 1028C may be transmitted to and from computer 1002 via communication medium 1024B. More particularly, computer 1002 may receive and transmit carrier waves (electromagnetic signals) modulated with control logic 1030 via communication medium 1024B.

As used herein, computer program product or program storage device refers to any apparatus or manufacture comprising a computer useable or readable medium having control logic (software) stored therein. In the exemplary embodiment illustrated in FIG. 10, this includes, but is not limited to, computer 1002, main memory 1008, secondary storage devices 1010, removable storage unit 1016 and carrier waves modulated with control logic 1030. Such computer program products, having control logic stored therein that, when executed by one or more data processing devices, cause such data processing devices to operate as described herein, and represent embodiments of the invention.

The invention can work with software, hardware, and/or operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A server architecture for enabling media rich Session Initiation Protocol (SIP) servlet based applications, comprising:
    a computer system with memory storage containing:
        an SIP servlet container including an SIP servlet and an SIP stack; and
        a media control layer providing access to a media server;
    wherein said SIP servlet and said media control layer enable a media rich SIP servlet, and
    wherein said media rich SIP servlet provides an integrated call and media control API and control primitives for use by SIP servlet based applications, thereby enabling media rich SIP servlet based applications.

2. The server architecture of claim 1, wherein said media control layer comprises:
    a first media resource stack configured to control Interactive Voice Response (IVR) functions;
    a second media resource stack configured to control Automatic Speech Recognition (ASR) and Text-to-Speech (TTS) functions; and a third media resource stack configured to control conference functions.

3. The server architecture of claim 1, wherein said media control layer communicates with said media server using MGCP (Media Gateway Control Protocol).

4. The server architecture of claim 1, wherein said media rich SIP servlet provides separate call control API and media control API for use by said SIP servlet based applications.

5. The server architecture of claim 1, wherein said integrated call and media control API is protocol independent.

6. The server architecture of claim 1, wherein said integrated call and media control API is device independent.

7. The server architecture of claim 4, wherein said media control API and said call control API are protocol independent.

8. The server architecture of claim 4, wherein said media control API and said call control API are device independent.

9. The server architecture of claim 1, wherein said SIP servlet based applications are web-based applications.

10. The server architecture of claim 1, wherein said SIP servlet based applications are telephony-based applications.

11. A method, being executed on a computer system, the method establishing a media rich Session Initiation Protocol (SIP) session at an application servlet residing on the computer system, the method comprising the acts of:
receiving an SIP INVITE message from a call agent at an SIP stack;
invoking a call back function at a media control servlet in response to said received SIP INVITE message;
sending a media control request object from said media control servlet to said application servlet;
setting parameters in said media control request object to specify required media resources; and
invoking a call back function at a media resource control layer to create a media session according to said required media resources.

12. The method of claim 11, further comprising:
sending a request from said media resource control layer to a media server to create said media session;
receiving a success confirmation from said media server when said required media resources are reserved for said media session; and
sending a media control session object from said media resource control layer to said media control servlet.

13. The method of claim 12, further comprising:
sending a success SIP message from said media control servlet to said call agent;
receiving a SIP ACK message from said call agent at said SIP stack; and
invoking a call back function at said media control servlet in response to said received SIP ACK message.

14. The method of claim 11, wherein said step of setting parameters is performed using a media control API.

15. The method of claim 12, wherein said media resource control layer communicates with said media server using a Media Server Markup Language (MSML) interface.

16. The method of claim 12, wherein said media resource control layer communicates with said media server using a Base Audio Server (BAU) interface.

17. A computer program product comprising a computer useable storage medium having computer program logic recorded thereon for enabling a processor to establish a media rich Session Initiation Protocol (SIP) session at an application servlet, the computer program logic being configured to:
receive an SIP INVITE message from a call agent at a SIP stack;
invoke a call back function at a media control servlet in response to said received SIP INVITE message;
send a media control request object from said media control servlet to said application servlet;
set parameters in said media control request object to specify required media resources; and
invoke a call back function at a media resource control layer to create a media session according to said required media resources.

18. The computer program product of claim 17, wherein the computer program logic is further configured to:
send a request from said media resource control layer to a media server to create said media session;
receive a success confirmation from said media server when said required media resources are reserved for said media session; and
send a media control session object from said media resource control layer to said media control servlet.

19. A computer program product comprising a computer useable storage medium having computer program logic recorded thereon for enabling a processor to establish a media rich Session Initiation Protocol (SIP) session at an application servlet, the computer program logic comprising:
a first receiving module that enables a processor to receive a SIP INVITE message from a call agent at a SIP stack;
a first invoking module that enables a processor to invoke a call back function at a media control servlet in response to said received SIP INVITE message;
a first sending module that enables a processor to send a media control request object from said media control servlet to said application servlet;
a setting module that enables a processor to set parameters in said media control request object to specify required media resources; and
a second invoking module that enables a processor to invoke a call back function at a media resource control layer to create a media session according to said required media resources.

20. The computer program product of claim 19, wherein the computer program logic further comprises:
a second sending module that enables a processor to send a request from said media resource control layer to a media server to create said media session;
a second receiving module that enables a processor to receive a success confirmation from said media server when said required media resources are reserved for said media session; and
a third sending module that enables a processor to send a media control session object from said media resource control layer to said media control servlet.

* * * * *